United States Patent [19]

Laws et al.

[11] Patent Number: 4,463,585

[45] Date of Patent: Aug. 7, 1984

[54] HEAT SHIELD ARRANGEMENT FOR A ROLLING MILL

[76] Inventors: William R. Laws, 19 Tudor Ave., Worcester Park, Surrey; Geoffrey R. Reed, 8 Beechdene, Tadworth, Surrey, both of England

[21] Appl. No.: 351,148

[22] Filed: Feb. 22, 1982

Related U.S. Application Data

[60] Division of Ser. No. 91,752, Nov. 6, 1979, Pat. No. 4,343,168, which is a continuation-in-part of Ser. No. 902,560, May 3, 1978, abandoned.

[30] Foreign Application Priority Data

| May 4, 1977 | [GB] | United Kingdom | 18760/77 |
| Apr. 27, 1978 | [GB] | United Kingdom | 16704/78 |
| Nov. 7, 1978 | [GB] | United Kingdom | 43506/78 |

[51] Int. Cl.³ .................. B21B 43/00; B21B 45/02
[52] U.S. Cl. ........................... 72/10; 72/13; 72/202; 72/342
[58] Field of Search ............. 72/13, 200, 202, 342, 72/10; 266/103; 432/45, 59, 230

[56] References Cited

U.S. PATENT DOCUMENTS

| 1,676,176 | 7/1928 | Biggert | 72/202 |
| 1,959,095 | 5/1934 | Etherington et al. | 72/202 |
| 2,177,971 | 10/1939 | Worthington | 72/202 |
| 2,742,691 | 4/1956 | Belitz et al. | 72/38 X |
| 3,264,856 | 8/1966 | Layard | 72/202 |
| 3,344,648 | 10/1967 | Gray | 72/202 X |
| 3,877,867 | 4/1975 | Tsuchiya et al. | 432/45 |

FOREIGN PATENT DOCUMENTS

| 1416688 | 9/1965 | France | 72/202 |
| 45-415 | 1/1970 | Japan | 72/202 |

*Primary Examiner*—E. Michael Combs
*Attorney, Agent, or Firm*—Murray Schaffer

[57] ABSTRACT

A heat shield arrangement for strip material employs insulating panels of thin-walled composite construction. The panels include an upper series displaceable upwardly by power actuation means to avoid damage by buckled or lifting material. Protective members projecting below the upper panels are associated with sensing means to actuate the raising of the upper panels and can have a limited displacement before the raising of the upper panels is actuated. The power actuation means can themselves act on the sensing means to determine the minimum force from the material that causes raising of said panels. Control means displace the panels in response to the sensed transverse temperature profile to maintain the profile more uniform and some of the panels may have heating means for this purpose.

8 Claims, 22 Drawing Figures

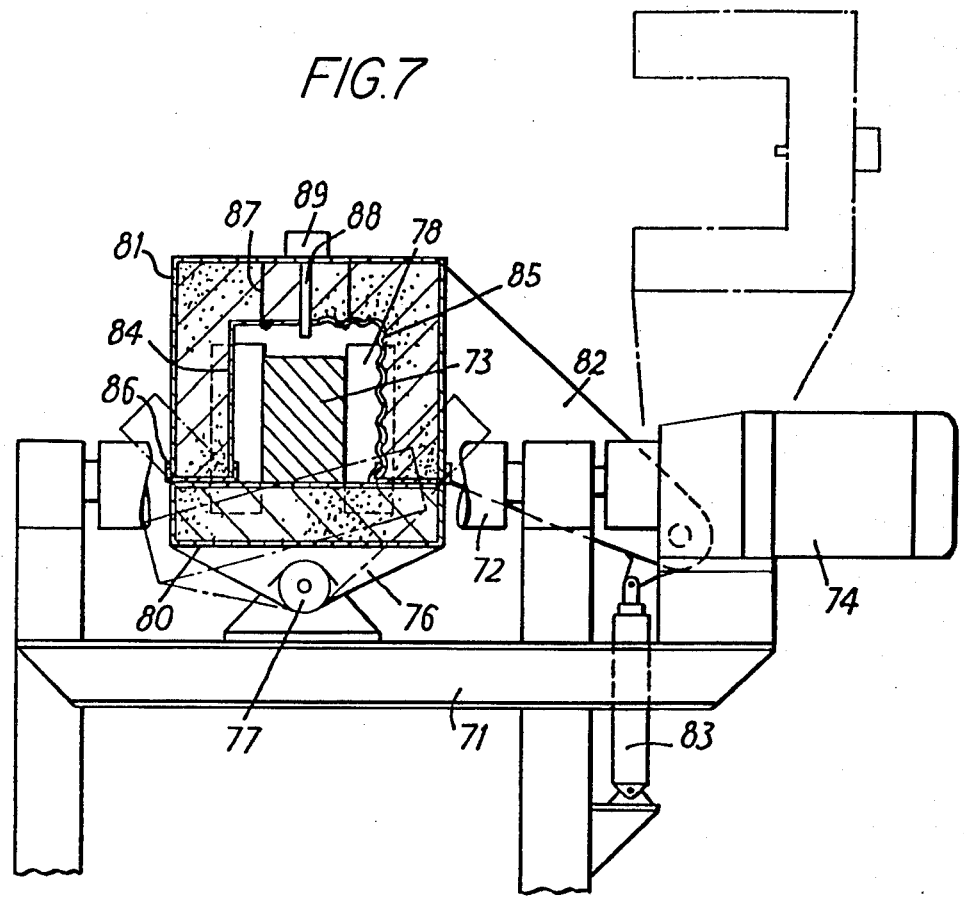
FIG.7
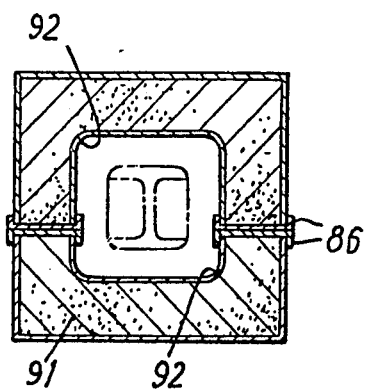
FIG.8
FIG.9

HEAT SHIELD ARRANGEMENT FOR A ROLLING MILL

This is a Division of Ser. No. 91,752 filed 11/6/79 now U.S. Pat. No. 4,343,168 which was a continuation-in-part of Ser. No. 902,560 filed 5/3/78, now abandoned.

BACKGROUND OF THE INVENTION

This invention relates to heat shields and it is concerned particularly, but not exclusively, with heat shields for use in metal processing.

In steel mill processing whether of billets, strip or sections, the metallurgical qualities of finished product are closely related to the accurate control of temperature of the material during the hot rolling process. For example, a modern hot strip mill producing steel coil is several hundred meters long and typically, steel slabs or billets may be reduced from 25 cms thickness to 0.2 cms using several roughing mill stands and five or more finishing mill stands. During the rolling process considerable heat losses occur so that the slabs have to be heated initially well in excess of the temperature requirement at the end of the process, but a particular problem has been that the heat losses from slabs passing along the mill depend upon the time taken. If the slabs are delayed, excessive heat losses occur and the steel strip does not have its required rolling temperatures, so that it may have to be downgraded or even scrapped. In many long modern rolling mills the delay of one length of strip at the finishing end has an effect on the several lengths of material which are simultaneously at various preceding stages of rolling. Thus with more stringent quality specifications it is becoming more important to reduce the rate of heat loss from the material during transport between stands.

There is an added difficulty in this because during the final reduction stages the back end of the strip takes longer to pass through the finishing mills and so there is a temperature "run-down" along the steel strip due to the cumulative time delay along the length of the strip. The effect of temperature "run-down" is to some extent ameliorated by accelerating the finishing mills during the rolling of each individual slab or strip, but nevertheless it remains a problem.

Attempts have been made in the past to reduce the heat loss from the top surface of a hot strip during transport from the roughing mills to the finishing mills. Because radiation is a major source of heat loss at the temperatures involved (around 1060° C.) aluminium reflectors have been fixed over the path of the hot strip to reduce temperature "run-down". However maintenance problems limit the usefulness of reflectors which become inefficient as soon as they become dirty, and in addition, the aluminium reflectors which have been used for their high reflectivity and relatively low cost can reach their melting temperature if their reflectivity decreases.

It has been proposed (U.K. Pat. No. 1,040,420) to use heat-insulating or reflecting panels as heat shields that present to the hot material a face formed by a thin plate of stainless steel backed by a core of thermal insulation, so that the plate forming the hot face of the panel is preheated to a luminous temperature close to that of the material being processed. In this arrangement, however, the panel could be easily damaged if there is a malfunction that causes material being processed to strike the panel, for example if the material is bent or if it lifts as it runs along its path. A mishap of this kind can easily occur in a steel rolling mill in which the steel stock is often travelling at very high speeds.

SUMMARY OF THE INVENTION

According to one aspect of the present invention, there is provided a heat shield arrangement for hot material being processed in a hot-rolling mill, e.g. for metal strip (e.g. a slab or sheet) or for rolled metal sections, the arrangement comprising a series of heat insulating panels above the path of the material being processed, the panels each having a heat-insulating core and a cover plate forming or overlying a main face of the panel being adapted to act as a hot face presented to the material being processed and to radiate heat back to the material, the series of panels being provided with displacement means for displacing them on their supports upwardly away from the path of the material and sensing means being provided adjacent the material path responsive to upward distortion or lifting of the material and to actuate thereby control means that initiate operation of said displacement means to lift the panels away from the material to protect them against damage.

It is thus possible to provide contact elements projecting downwardly in the region of the cover plates of the upper group of panels to below the level of the cover plates, said contact elements being of a relative robust nature compared with the panel cover plates and acting as sensing means for operating control means that actuate said panel displacement means, whereby if the material lifts and strikes the contact means the displacement means are immediately actuated to lift the panels away from the hot strip material.

Although raising the upper panels clear of the material will protect those panels from damage, there is the disadvantage that each time this happens the sheet material will itself be adversely affected by the uncontrolled cooling that occurs when the upper panels are raised. There will be many instances when the rolling process has been interrupted unnecessarily, with consequent increase of costs and delay, because the lifting of the strip material would not have caused damage to the panels.

According to another aspect of the present invention, there is provided a heat shield arrangement for a heated length of strip material (e.g. a slab or sheet) comprising heat-insulating panels arranged adjacent to a travel path for the material and including a series of upper panels extending over said path, displacement means comprising power actuation means for raising said upper panels away from said path being actuable by sensing means responsive to lifting or upward deformation of the strip, said power actuation means influencing the sensing means to determine the magnitude of the upward force from the strip at which the sensing means responds, whereby the panels are maintained in operative lowered positions in normal operating conditions until said determined force is exceeded.

Preferably, protective bumper or fender elements project below the upper panels. These elements may be fixed relative to the upper panels but preferably they are carried by mounting means that permit some displacement relative to the panels. The sensing means may similarly be fixed relative to the upper panels but preferably comprise elements also mounted in a relatively displaceable manner, advantageously on said protective element mounting means.

The invention makes it possible to provide a relatively restricted vertical spacing betwen the upper and lower panels without disturbing that spacing except in case of need. Problems can arise, however, because although during rolling the main extent of a slab or strip will usually be relatively flat, its ends can be turned-up (i.e. curved upwards or downwards) to a certain degree because of the forces applied to each end portion as it passes unsupported through a set of rolls, and the effective height of the material may be increased thereby to many times the material thickness. This effect is particularly marked when a strip is rolled in a semi-continuous mill having reversing roughing roll stands through which the initial slab is passed forwards and backwards repeatedly to reduce its thickness, but in a continuous mill the leading end of the strip will also be deformed in a similar way.

According to another aspect of the invention, there is provided a heat shield arrangement with heat-insulating panels arranged adjacent to a travel path at least an intermediate region longitudinally of said path where upper and lower series of panels are disposed with a limited vertical spacing between them to form a travel path of restricted height, and wherein at an entry region of the arrangement an increased height passage is provided for the introduction of a turned-up strip material, said entry passage decreasing in height to lead into the limited vertical spacing of said intermediate region.

This measure can be employed with particular advantage in combination with the displacement means operable in dependence on the force of the lifted material, as aforesaid, since the entry region may offer sufficient resistance to reduce the turn-up of the leading end of the material and so help to minimise the vertical spacing between the upper and lower insulating panel in the intermediate part of the heat shield arrangement. The employment of an increased height entry section is, however, also of value if the aforesaid displacement means are not provided.

It is possible for the entry region, especially if relatively short, to comprise a relatively robust bar or frame structure with little heat-insulating effect if any, but it will be preferred, particularly if it is required to provide a relatively large maximum height entry, that at least a part of the entry region is composed of upper and lower heat-insulating panels the vertical distance between which panels is progressively reduced along the length of the material path towards said intermediate region.

In an arrangement in which the main or intermediate path of the channel path has a relatively uniform insulating effect due to the closeness of the upper and lower panels, the benefit of this may be partly lost where the panels must be more widely spaced apart, for example at an increased height entry region. In such cases, to obtain the desired degree of uniformity of heat insulation it may be preferred to provide panels at the sides of the strip travel path, with heating elements disposed on or within at least some of said side panels. In this way it is possible to counteract the greater heat loss from the edges of the material due to the additional surface area, and especially at the ends of the heat shield arrangement where in addition to any increased spacing of the upper and lower panels, the panels may themselves not be close to the heated material temperature.

In any event, the panels are preferably so arranged that they provide an enclosure that substantially completely surrounds the material path. Alternatively, it may be sufficient to arrange that there is substantially no straight-line path for heat radiation from the strip past the panels transverse to the travel path of the strip.

In the arrangement disclosed in U.K. Pat. No. 1,040,420; the heat-insulating panels are disposed in series over a rolling mill delay table, so as to reduce the loss of heat from hot sheet material on the table, and a pyrometer immediately in front of each panel is able to actuate displacement of its panel transversely away from the table. Thus, when the strip advances onto the delay table each insulating panel will be moved to its operative position over the strip if the pyrometer senses a strip temperature significantly less than a preset value, and if the temperature rises above the preset value the panels are displaced laterally clear of the table and the strip.

This arrangement, however, is only of limited value because it relies upon the temperature of the strip being sufficiently uniform over the region of each panel for effective control of the panel temperature to be obtained by the positioning of the heat-insulating panel in one of its two alternative positions. There can in fact be significant local temperature gradients, and it has been found that there may in particular be significant temperature differences across the width of a sheet of hot material—so that there is likely to be a substantially higher rate of cooling of the outer lateral margins of the sheet as compared with its central region.

According to another aspect of the present invention, a heat shield arrangement is provided comprising a series of heat-insulating panels mounted above a path for the hot material, the panels each having a heat-insulating core and a cover plate forming or overlying a main face of each panel being adapted to act as a hot face presented to the material being processed and to radiate heat back to the material, characterised in that the panels of the series are arranged in groups of two or more panels disposed side-by-side across the lateral extent of the path of the material, and means are connected to said plurality of panels for displacing the panels with respect to each other for varying their heat-insulating effect on a central region of the hot material relative to the lateral margins thereof, at least one array of temperature sensors being laterally spaced across the material path, and control means actuated by said sensors being connected to said displacement means in order to control the temperature and/or the transverse temperature profile of the material being processed in accordance with predetermined values.

Said displacement of the panels may take place by movement of the laterally opposed panels towards and away from each other, maintaining their height above the material path, or it can involve tilting of the panels so that they are raised relative to the central region of the material path and therefore have a lesser effect there, but preferably the displacement means are adapted to provide both these motions alone or in combination.

A heat shield arrangement according to the invention preferably also has heat-insulating panels disposed below the material path. These panels also may be arranged to be displaceable for varying the heat-insulating effect across the width of the material, e.g. by providing means for moving them laterally towards and away from each other.

On a conventional strip mill delay table, the sheet material path is defined by a series of rollers on which the material is supported. According to a preferred feature of the invention, said rollers comprise upper smaller diameter rollers upon which the material rests, and lower larger diameter rollers that support the upper rollers. In this way, it is possible to increase the proportion of the lower face of the material path that is shielded by the lower series of heat-insulating panels, since these panels can overlap the larger rollers to extend close to the upper, smaller diameter rollers.

There is a further advantage arising from the use of the smaller diameter upper rollers in that the best transfer by conduction through these will be less than for the larger diameter rollers of a conventional rolling mill table. This loss can be still further reduced by limiting the contact area between the upper and lower rollers, in particular by arranging that the upper rollers are only in contact with a plurality of axially spaced larger diameter portions formed on the lower rollers.

Preferably, the upper series of panels are mounted on support means provided with a raising mechanism which allows them to be raised to gain access to the conveying path, and the raising mechanism may be arranged to operate automatically to protect the panels should there by a malfunction that causes the material being processed to lift and strike the panels.

The control of the temperature of material being processed by varying the heat shielding effect transversely across the material is not appropriate in some instances, for example in processing narrow cross-section materials such as bars and rolled sections. In these instances, according to another aspect of the invention, there is provided a heat shield arrangement comprising heat-insulating panels disposed along a path of the material being processed, the panels each having a heat-insulating core and a cover plate forming or overlying the face of each panel being adapted to act as a hot face presented to the material being processed and to radiate heat back to the panel, characterised in that the panels form a tubular enclosure to surround all sides of the material path with the upper and lower regions of said conduit being provided by respective upper and lower panels, and at least some of the panels being mounted on displaceable support means to open the tubular enclosure.

Conveniently, contact means for the material being processed are provided for operation of the displacement means of the displaceably mounted panels in order to lift said panels away to avoid damage by material that is distorted or that has lifted, as already discussed.

In a preferred construction for the performance of the invention, each panel comprises a core of fibrous ceramic material providing a heat-insulating layer and enclosed in a protective casing, the cover plate forming or overlying a main face of said casing and being capable of relative thermal expansion with respect to the casing. If the cover plate is made relatively thin to have a low thermal capacity, at least a part of its area may be provided with dimples, corrugations or other locally contoured formations to increase the heat emissivity of its surface and such contouring may also be arranged to contribute to the strength of the cover plate and its ability to withstand thermal stresses, as well as to allow a measure of independent thermal expansion by flexure.

The casing may comprise a peripheral housing that supports the cover plate in a manner that permits relative thermal expansion of the cover layer, and the opposite main face of the panel forming its cold face may similarly be provided with a cover plate mounted in a manner permitting relative thermal expansion, so that thermal stresses on the casing are kept to a minimum.

Preferably, the casing provides a substantially dust-tight enclosure for the insulating core and venting apertures may be arranged in the casing for the escape of air and steam from within, the apertures being provided with valves for preventing or limiting a return flow through them.

BRIEF DESCRIPTION OF THE DRAWINGS

The invention will be more particularly described by way of example, with reference to the accompanying drawings, wherein:

FIG. 7 is a transverse cross-section of a further form of heat shield arrangement according to the invention, FIGS. 8 and 9 are schematic illustrations of alternative heat-insulating panels for the arrangement of FIG. 7, FIGS. 10 and 11 illustrate details of a modified front plate construction for a panel according to the invention.

DESCRIPTION OF THE PREFERRED EMBODIMENTS

Figure 1:
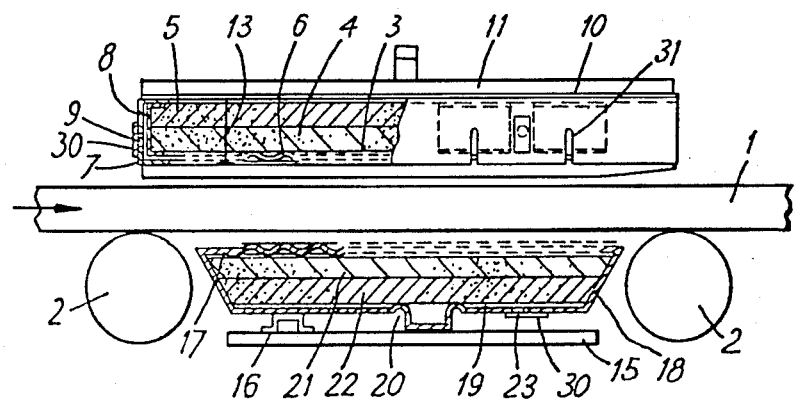
FIG. 1 is a longitudinal vertical section of a portion of the strip conveying path in a hot strip rolling mill showing upper and lower panels according to the invention used in a heat shield arrangement.

Referring to FIG. 1 of the drawings, a hot strip mill delay table is shown with a hot steel slab or strip 1 resting on rollers 2 and with low thermal mass insulation panels according to the invention disposed above and below the strip.

The upper panel comprises a casing containing a two-layer core of heat-insulating material consisting of high temperature ceramic fibre board insulation 4 adjoining a bottom cover plate 3 forming the hot face of the panel, the insulation 4 being backed by lower temperature insulating board 5. The cover plate 3 is formed by a thin sheet of temperature resistant material, e.g. stainless steel, which material can be made either heat reflecting or adsorbing. The cover plate rests upon heat-resistant angle-section frame 7 of the casing, which allows free thermal expansion of the plate, and slots 31 in the frame also allow its relative thermal expansion. The top of the panel is sealed by a top plate 10 to which is fixed a mounting lug 11.

In use, as the hot strip 1 enters under the panel heat radiated from the strip will impinge on the cover plate. Initially the front end of the strip will cool at almost the rate it would achieve in free air while the cover plate is cool. If the plate is thin—for example, less than 1/50th of the thickness of the hot strip 1—then its temperature will quickly rise to closely approach the strip temperature without a significant drop in strip temperature, and as heat loss into the panel is minimised by the thermally insulating core and the panel almost immediately begins to re-radiate heat and approach thermal equilibrium with the strip.

The total effective emissivity of the cover plate of the re-radiating panel is increased by substantial corrugating or dimpling or like local contouring 6 of its surface, and since the cover plate is preferably very thin such contouring can serve to strengthen the plate and allow local flexing to facilitate relaxation of thermal stresses set up by rapid heating and cooling of the plate.

The cover plate is held from above against the horizontal flanges of the frame 7 by leaf springs 8 to help provide a seal between the plate and the frame and so minimise the intrusion of dirt and steam into the ceramic fibre core. Vents 9 can also be provided in the side walls of the mounting frame 7 to facilitate the escape of steam if, as during periods of inactivity, water is adsorbed by the core and is subsequently vaporised by the heating that occurs when the panel begins to be used again. One-way flap valves 30 on the vents 9 help to prevent the ingress of steam from the surroundings. It should be noted that if the cover plate is very thin, extra retaining clips 13 may be required to hold it against the ceramic fibre material of the core.

It will be clear that almost half the heat radiated by the strip is from its lower surface. The problems presented in placing a panel under the strip are greater than for the top panel and in general a modified construction will be required. The lower panel shown in FIG. 1 is supported on the table base plate 15 and can rest thereon either directly or through brackets 16. The cover plate 17 forming the hot face of the lower panel has local contouring like the plate 3 but forms an integral part of an outer casing of welded construction with stainless steel side walls 18 and base 19 as below the strip greater protection is needed against the ingress of foreign matter. The contouring is preferably in the form of a series of parallel corrugations arranged particularly to accommodate thermal expansion of the hot face relative to the remainder of the panel, but because the cover plate is restrained at its edges, the casing is made relatively narrow in the direction of the corrugations, e.g. some half the length transverse thereto. The corrugations also increase the effective emissivity of the hot face, as mentioned above, and strengthen the relatively thin material.

The base of the casing has one or more corrugations 20 to allow differential thermal expansion and the panel is filled with a core of higher and lower temperature insulating ceramic fibre panels 21, 22 respectively, similar to the upper panel core. Small steam vents 23 are provided in the base of the panel to allow venting of trapped water and these are normally closed by one-way flap valves 30.

A number of lower panels are disposed side-by-side across the width of the strip and not only reduce the heat loss from the bottom of the strip, but by extending close to the opposed sides of successive rollers of the delay table they also reduce the thermal load on the rollers thereby improving their operating life and reducing the amount of water cooling required.

Figure 3:
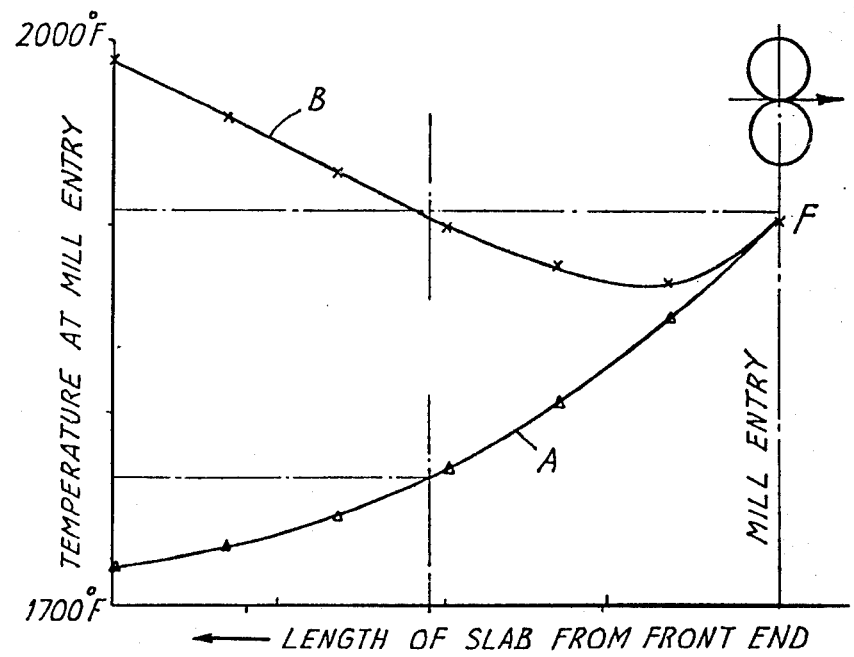
FIG. 3 is a graph illustrating temperature run-down of a slab in a hot strip mill and the influence on this of a heat shield arrangement according to the invention.

The effect of a series of such upper and lower panels as a heat shield in a rolling mill can best be understood by reference to FIG. 3, which shows the temperature of a strip or slab at entry to the roll train of a mill after it has passed along a delay table. Curve A shows how the temperature of the strip, as sensed at the mill entry, runs down because of the increasing heat losses that have occurred at points progressively further back along the length of the strip due to the increasing delay before entry as dictated by the travel speed of the strip in the rolls. The initial temperature of the strip would be, say 2012° F. and while the front end temperature loss might be some 100° F. at mill entry (point F), further back along the strip the material arrives at the mill with a progressively lower temperature. Curve B shows how the heat shield arrangement of panels according to the invention gives a similar temperature fall at the front end of the strip, while the panels are still cool, but they almost immediately radiate heat to reduce the temperature fall and very quickly approach the initial temperature of the strip and can reverse the temperature profile for the rear end of the strip, so as to give a more uniform temperature at roll entry.

In a sufficiently long run, the rear end temperature of strip can of course approach the initial strip temperature, but in general the form of the temperature distribution at points along the strip length at their entry to the mill can be controlled by choice of the storage and conductivity characteristics of the hot faces of the panels and the heat insulating cores. It is even possible to incorporate heating means in the panels adjacent their hot faces to give a more uniform exit temperature, but usually this would only be required for material having a relatively low thermal mass, such as bars and sections.

As already stated, the cover plates can be heat-reflecting but in general it will be found convenient to make them black to suit the dirty environmental conditions and in this case they can operate better to improve the temperature distribution in the common condition of a strip with a higher temperature leading end in the manner shown in FIG. 3, or similarly where there is some time lag in the passage of the trailing end to a roll stand.

Figure 2:
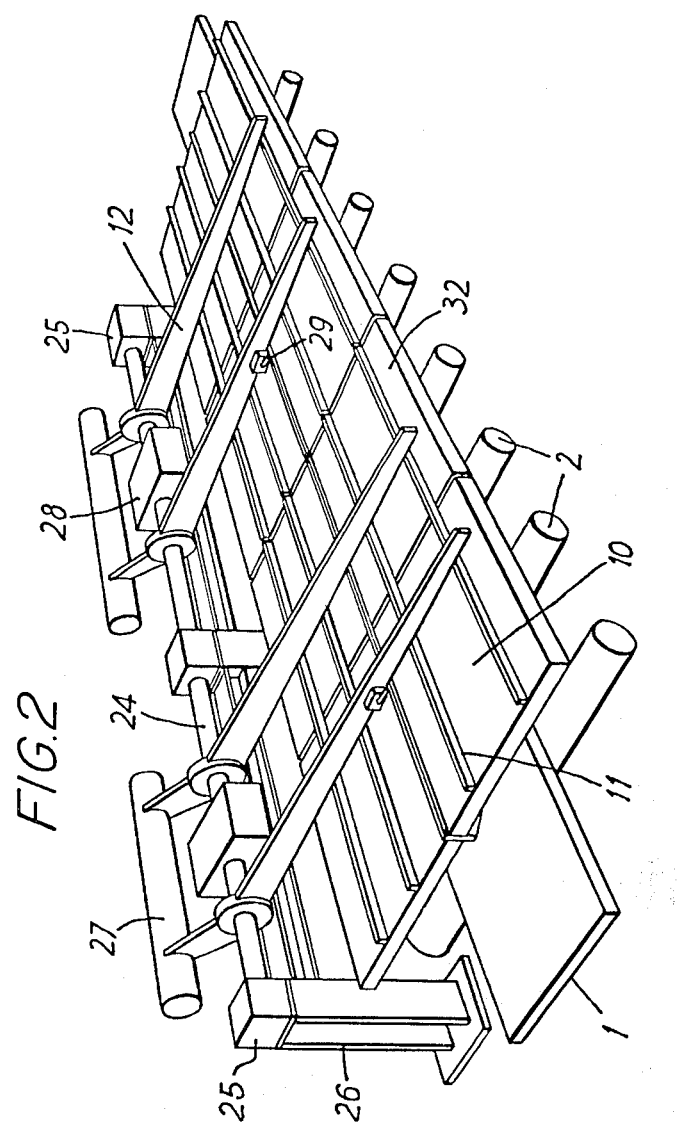
FIG. 2 is a perspective view of a part of a transfer conveyor of the mill showing only the upper panels in place.

The mounting of the lower panels presents no problems but the top panels require to be mounted so that they can be readily lifted from over the hot strip, e.g. for maintenance or to allow the removal of the strip in the event of a long stoppage or to prevent damage to the panel if there is a buckled or bent strip. FIG. 2 illustrates a mounting means suitable for strip mill applications in which upper panels 32 are suspended over the tables in pairs by their top plates 10 and mounting lugs 11 from booms 12, although for narrow mills one panel width will be sufficient to span the roller table whereas on wide mills as many as four panels side-by-side may be required. The panels are arranged in a row or rows extending along the strip-conveying direction to make up the required heat shield area. It will be understood that the smaller width of the lower panels dictated by thermal expansion considerations in this particular use will result in the provision of a larger number of panels than the upper panels to cover the same width.

The booms 12 are mounted as cantilevers from shafts 24 on external floor-mounted frames at one side of the mill the shafts being supported in rotary bearing blocks 25 to be able to pivot the booms through substantially 90° between the horizontal position shown and a raised vertical or near vertical position. Columns 26 carrying the bearing blocks are positioned so as to provide access to the roller drive motors (not shown) of the mill. The panels and booms are counterbalanced on the shafts by weights 27 and the movement of the panels is obtained by motors 28, e.g. hydraulically operated, which are designed to give positive drive both when raising and lowering the panels.

Operator controls (not shown) are provided for the motors 28 to allow the panels to be raised and lowered for maintenance or access to the mill. To prevent damage to the panels during operation, e.g. if there is a bent or buckled strip in the mill, a skid bumper bar or fender bar 14 is fitted to certain of the panels or to the boom structure so that the bent strip will contact the bar to push the panels upwards. Preferably, the skid bumper bars are connected to pressure switches 29 which activate the raising movement of the motors 28 in such an eventuality, so that the panels are lifted independently of the force on them.

Figure 4:
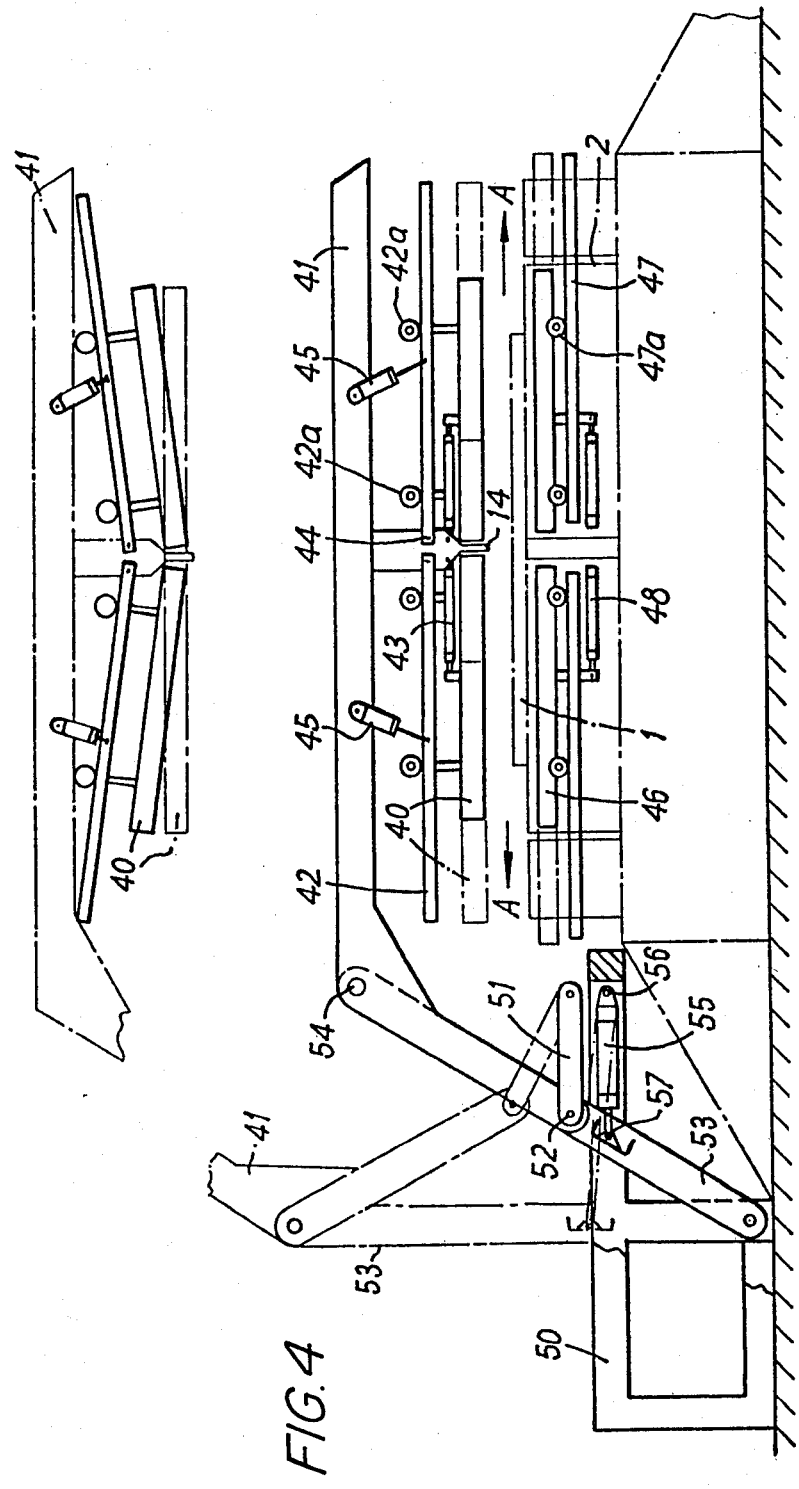
FIG. 4 is a transverse cross-section of a heat shield arrangement, analogous in many respects to the embodiment of the invention shown in FIG. 2, but incorporating adjustment means for the panels.
Figure 5:
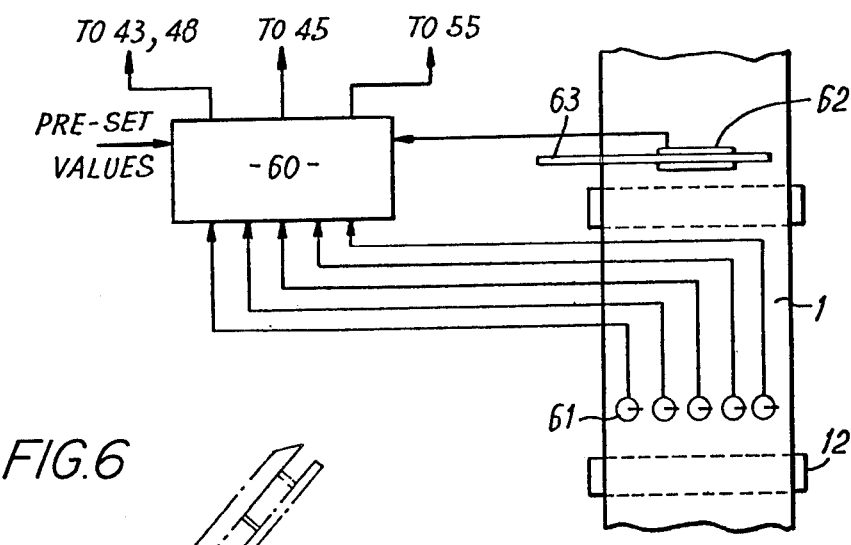
FIG. 5 is a schematic illustration of the control means for the arrangement of FIG. 4.
Figure 6:
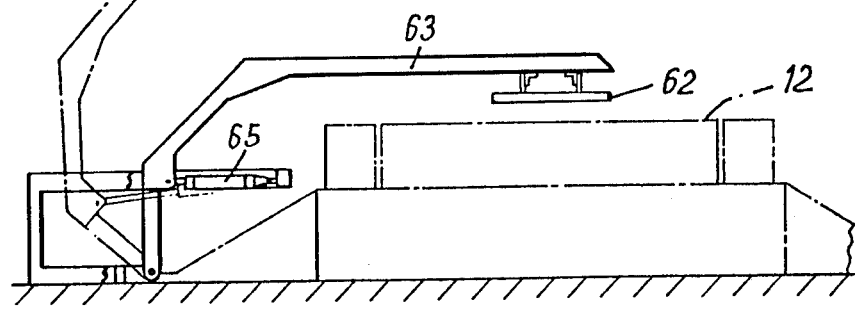
FIG. 6 is a transverse cross-section of a protective device for the arrangement of FIGS. 4 and 5.

In FIGS. 4 to 6 there is shown a further development of the invention in the example of steel strip rolling mill similar in many respects to that shown in FIG. 2, but in which the heat shield panels can be adjusted in position to achieve a more uniform temperature distribution in the hot material.

Upper panels 40 are mounted on cantilever arms 41 over the conveyor for the steel strip 1, so that as in FIG. 2 the panels are able to cover the entire upper face of the strip. In this embodiment not only are the cantilever arm supports of the panels displaceable to move the panels towards and away from the strip, but the panels themselves are displaceable on the arms to regulate their effect on the strip.

For this purpose the panels may be conveniently arranged in pairs with the central bumper bar 14 independently mounted between them. The panels are supported by transverse rails 42 that are secured below the cantilever arms and are suspended from rollers 42a running on the rails so that they can be displaced laterally towards and away from each other by rams 43, as indicated by the arrows A in FIG. 4. Each rail is pivoted at its inner end 44 and connected by rams 45 to the arm 41, so that by operation of the rams the rails can be tilted about their pivots, and in particular can be so tilted as to raise the laterally outer edges of the panels as shown in outline in FIG. 4. The lower heat shield panels 46 below the strip path are also mounted through rollers 47a on rails 47, which in this instance are fixed, so as to be movable laterally inwards and outwards by rams 48 in the same manner as the upper panels.

The movements of the different rams during the operation of the arrangement to control the temperature of a steel strip travelling along the conveyor path is governed by a control unit 60 (FIG. 5) receiving signals from an array of temperature sensors 61 disposed across the width of the strip. It is unnecessary to illustrate the detailed construction of the unit 60, since the principles of control equipment design by which these signals are utilised to give the outputs indicated below are well understood and are fully within the knowledge of a person skilled in the art. If the sensors indicate that the temperature at the edges of the strip is too high, the rams 45 between the cantilever arms and the upper rails 42 can be operated to tilt the outer edges of the upper panels upwards, the angle being adjusted to suit the required heat loss rate. If, on the other hand, the temperature at the centre of the strip is too high the panels 40 and/or 46 can be traversed on their rails so as to leave a gap at the centre, both above and below the strip, to allow increased radiation from that region. The extent of the opening movement and the number of panels opened along the length of the conveyor path can both be adjusted to suit the extent of the temperature correction required.

It is also possible to lift the cantilever arms 41, with the panels 40, this serving both as a means of temperature control for the strip and as a means of protection of the panels against damage from a bent or buckled strip. For this purpose, as may be more clearly seen from FIG. 4, each arm 41 is mounted on a fixed frame 50 through a normally horizontal shorter link 51 pivoted at 52 to the lower end of the arm and a longer link 53 pivoted at 54 intermediate the length of the arm and normally lying parallel to the cranked end portion of the arm. The arm 41 is displaced by a ram 55 attached at one end 56 to the frame 50 and its other end 57 being connected to the longer link 53. The mechanism operates, when the ram 55 is extended, to produce a magnified pivoting movement of the arm 41, as shown in FIG. 4, the stroke of the ram being set so that the panels can be raised to a nearly vertical position, leaving clear access to the roller table.

As already indicated, the ram 55 can be operated by the automatic control means to regulate the temperature of the material. This can be done when it is required to lower the temperature of the strip as a whole rather than alter the temperature distribution, and normally it will be sufficient for only a small length of the total length of the upper series of heat shields to be lifted away for this purpose. The number of panels so raised will determine the cooling effect obtained. The rams 55 may also be automatically operated if a bent or buckled strip is in the mill. The bumper bars 14 provide initial protection in this eventuality, but they also can be provided with pressure-sensitive switches so that as the strip bears against them, the rams 46 are actuated and the upper panels are immediately raised clear of the strip, independently of whether they have actually been contacted by the deformed strip.

It will be understood that the control unit may comprise means for readily adjusting the set points or required temperature limits to suit different materials being processed, and there may be a number of arrays of temperature sensors at different stations along the length of the strip conveyor path, either operating upon the same control unit or operating upon separate control units for individual stations of the conveyor path.

The bumper bar 14 may be used in a similar manner to that described with reference to FIG. 2, to raise or actuate raising of the upper panels when there is a risk of damage from buckled or bent stock. Additionally or alternatively, there may be a bent stock detector 62 (FIGS. 5 and 6) disposed over the conveyor upstream of the panels to indicate the approach of raised parts of the strip that might damage the panels. The detector support arm 63 may have a simple pivot mounting 64, controlled by a ram 65, to swing the detector clear of the conveyor when required, but it may alternatively have the same form of displacement mechanism as the arms 41. It should be understood, moreover, that such a detector may also be employed in the first-described arrangement in which the panels are fixedly mounted on their support.

The invention is not restricted to installations in which the heated material is in strip form, and FIGS. 7 to 9 illustrates the application of the invention to control the temperature of bar or profiled section stock moving along a conveyor path.

Mounted on a fixed frame 71 are drive rollers 72 for the stock 73, shown here as a square section bar, driven by one or more motors 74. The conveyor path runs perpendicular to the plane of the figure. Mountings 76 pivotable about an axis 77 parallel to the conveyor path carry upwardly projecting side support rollers 78 for the stock and lower heat shield panels 80 of the composite construction already described. Together with upper U-form panels 81 of similar construction these lower panels 80 form a tubular enclosure for the stock. The upper panels 81 are supported on pivot mountings 82 that allow them to be swung upwards to the broken-line position by rams 83, clear of the conveyor and the stock on it. When the upper panels have been swung away in this manner, the side support rollers 78 can be pivoted downwards to give free access to the stock, in particular to allow bent or damaged stock to be removed more easily. The pivoting of the mountings 76 for the lower panels 80 allows them to be tilted when the installation is being serviced to shake off any accumulation of mill scale or other foreign matter.

Because the top panel has a cross-sectional profile that increases its stiffness as compared with the flat panels so far described, it can be made considerably longer: it may have flat faces 84 or axial corrugations 85 can be provided to stiffen the inner cover plate, as has already been described. This inner cover plate is allowed some freedom to expand axially and laterally and is retained in place by lipped edges 86 of the panel casing and heat-resistant ties 87 passing through the inner core of insulating material. A bumper bar 88 projects through the top panels to protect them from being damaged by out-of-shape material. As already described, the bar can be provided with impact sensors 89 arranged to trigger the operation of the lifting rams 83 for raising the top panels.

The cross-sectional profile of the panels can be varied, for example, to suit a particular cross-section profile material, as is exemplified in FIGS. 8 and 9. In FIG. 8, the bottom panel 91 also has a U-form profile increasing its stiffness and the radiussing of the cover plates at the inner corners 92 of the panels can improve the uniformity of the temperature of the stock passing through the arrangement. The corners of rectangular stock or even of the outer edges of the flanges of the I-section shown will normally radiate heat more freely and so cool faster, but the increased insulation of the radiussed corners of the panels has an opposite and therefore compensating effect. A similar effect can be obtained with the configuration shown in FIG. 9, where both panels 93 have a semi-circular cross-section.

Figure 10:
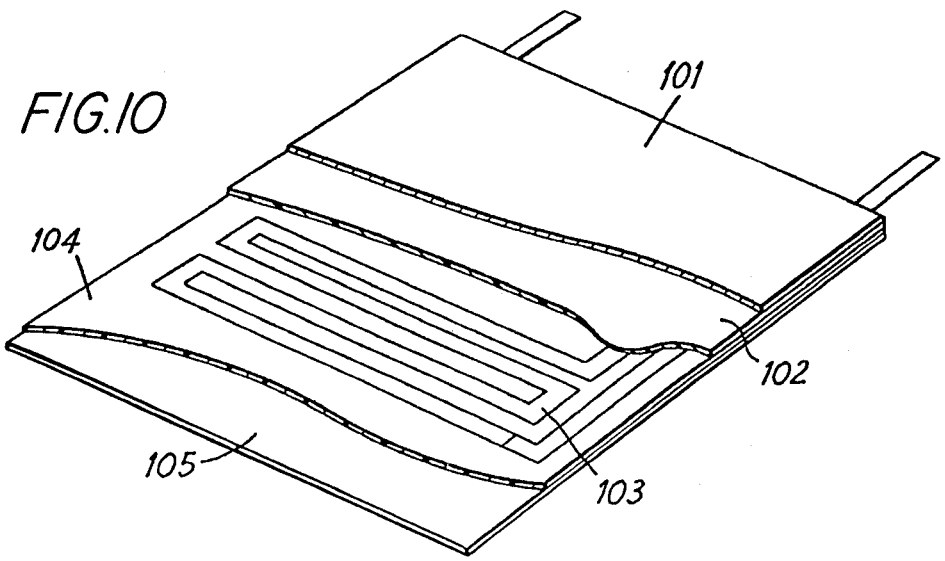
Figure 11:
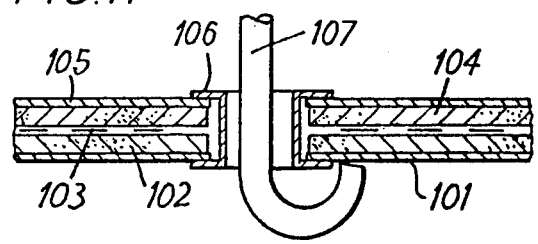

In some circumstances it may be required not only to conserve the heat in the material being processed but also to apply further heating. For example, this might be necessary if the material is to be held at a constant temperature. It is possible then to provide heating means in or on the insulation panels themselves, as is illustrated in FIGS. 10 and 11. These show a multi-layer cover plate, with a front plate 101 forming the hot face of the panel, a first electrically insulating layer 102, an electrical strip heating element 103 capable of operating at a temperature of 1100° C. or more, a second insulating layer 104, and a back plate 105 that like the front plate is suitable for use at high temperatures. The layers are secured together by hollow rivets 106 that may also serve to receive suspension ties 107 for the panel, although panels with cover plates of this construction are suitable for mounting both above and below the material being shielded. To maintain the material temperature, the element 103 may be of relatively low power, e.g. up to 5 kw/m$^2$, but higher powers may be used when required. It will be clear without further illustration that the control unit 60 can also regulate the operation of the heating elements.

Figure 12:
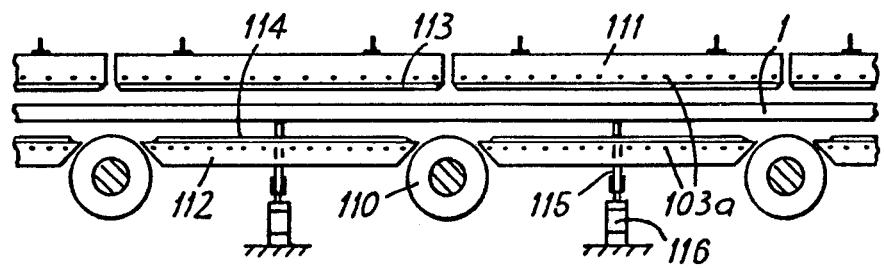
FIG. 12 is a longitudinal section of a heat shield arrangement illustrating a feature that can be employed in the arrangements of FIG. 2 or FIG. 4, FIGS. 13 and 14 illustrate in mutually transverse sections a modified roller construction that can also be employed in the arrangements of FIG. 2 or FIG. 4.

The use of panels with heating element is shown in the arrangement in FIG. 12, although tubular sheathed elements 103a are illustrated. This example shows a further heat conservation measure, it being assumed in this example that the arrangement is being employed with an existing steel mill roller table, which will be equipped with large diameter rollers 110 of high thermal capacity, often water-cooled. The upper and lower thermal insulation panels 111, 112 have the general composite construction already described and both series of panels are arranged in pairs side-by-side, with a central skid bar, 113 and 114 respectively, between the panels of each pair. The lower panels are also so constructed that there are two or more successive panels along the distance between adjacent rollers 110, and between these successive panels transversely extending lifting bars 115 are interposed. These bars, of a high temperature alloy and possibly also provided with heat insulation, can be raised, e.g. by fluid pressure rams 116, to the position shown and so lift the material 1 from the rollers 110. The mechanism can be used when the operation of the mill requires the material on the roller table to be stopped for any significant length of time. Because of the thermal mass and/or the cooling of the rollers, there would be the risk that cold spots would develop in the material at the regions of contact with the rollers, and that these would affect the uniformity of the final product.

Figure 13:
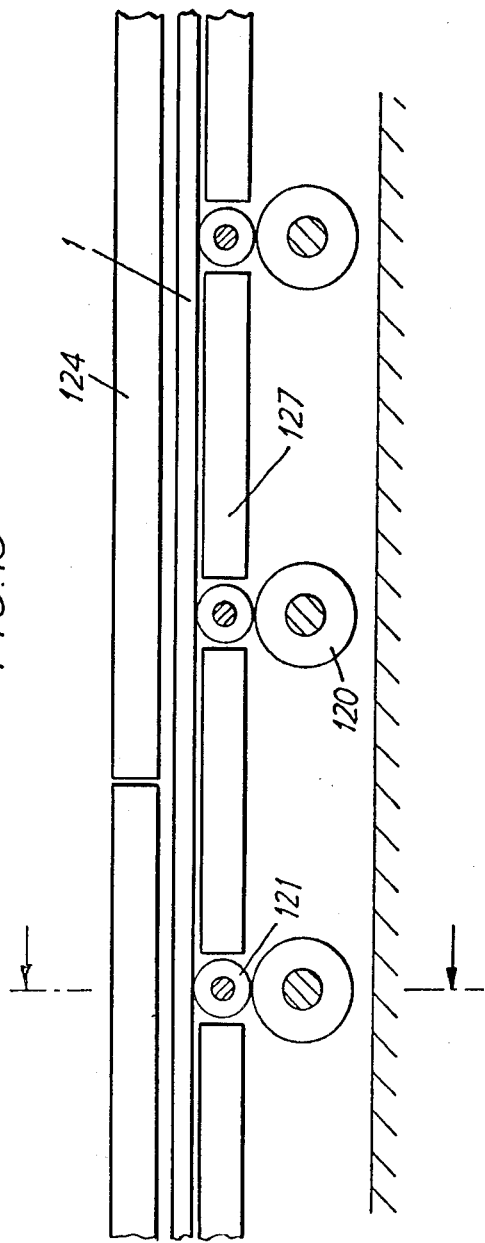
Figure 14:
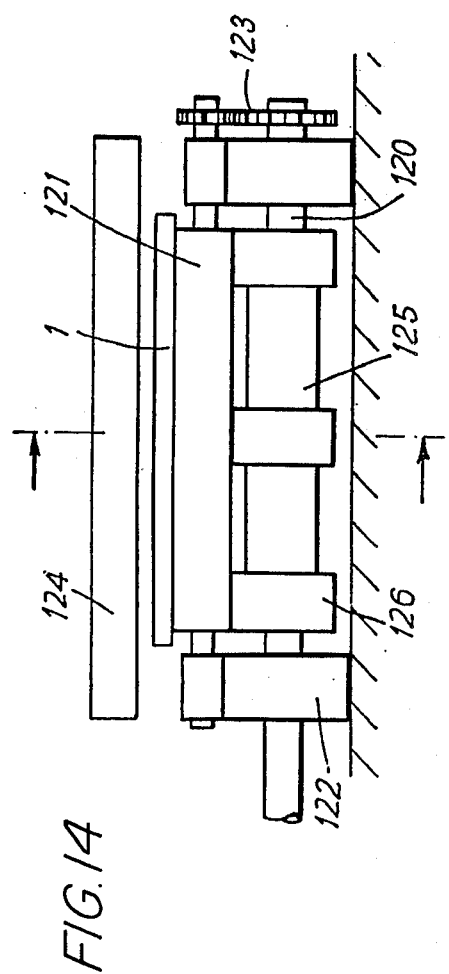

The problem of avoiding undue heat loss to the rollers can alternatively be overcome by modification of the roller table construction in the manner illustrated in FIGS. 13 and 14. The main supporting rollers 120 have smaller rollers 121 resting on them, the rollers 121 being of a heat insulating material. Both series of rollers are journalled in a housing assembly 122 and are driven together, as by the gearing 123. It may be arranged that the housing assembly can readily be opened to remove the rollers 121 at least, when servicing is needed. Upper heat-insulating panels 124 can be lifted clear in the manner already described when this is to be done.

The main rollers preferably have reduced diameter portions 125 so that the contact area between the rollers 120, 121 is confined to the relatively small extent of the larger diameter portions 126, so reducing any heat loss through conduction. If scale drops from the material on the table this measure also helps the scale to fall clear. It is a further advantage in the use of the smaller diameter high-temperature rollers that the lower heat-insulating panels 127 can be brought closer together, so that there is a further reduction of heat loss by radiation.

Figure 15:
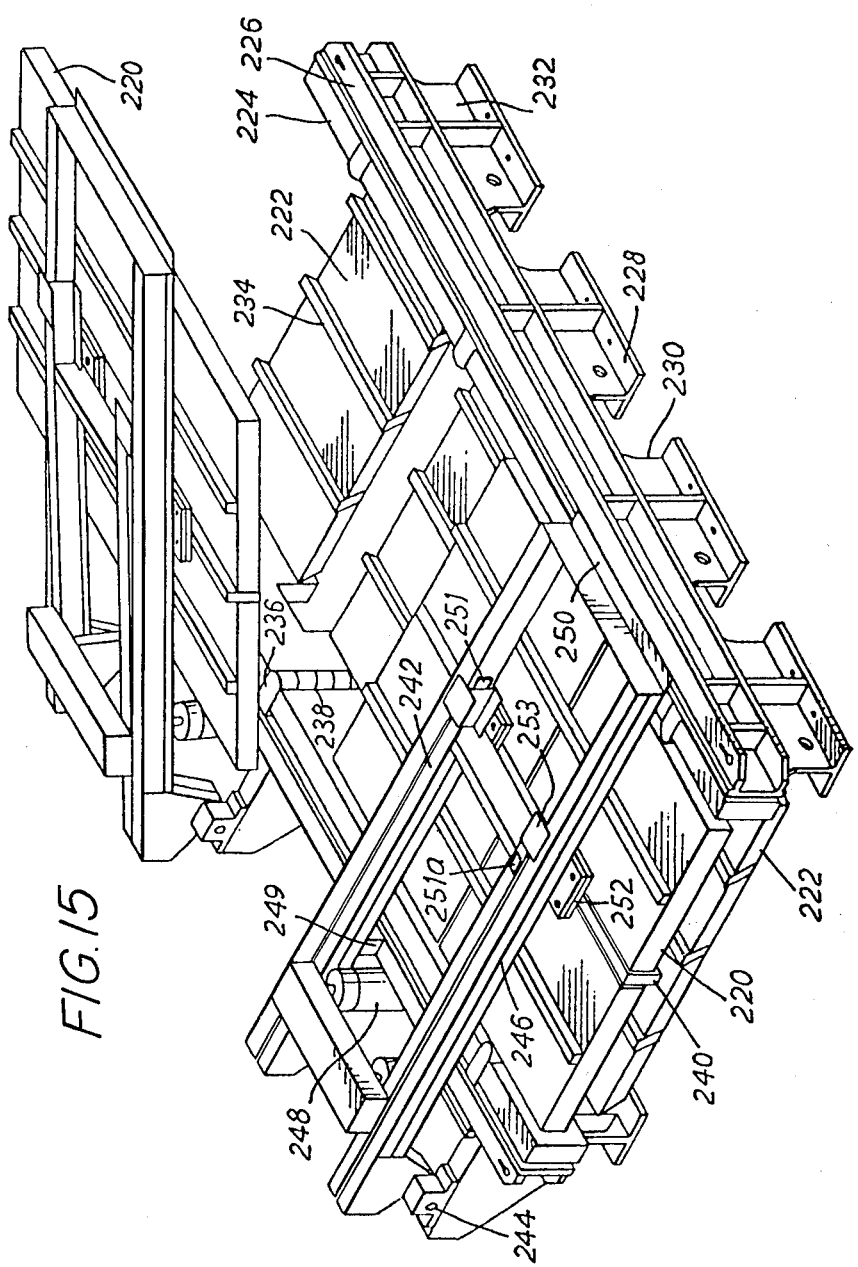
FIG. 15 is an isometric view of a heat shield arrangement having upper panel displacement means according to the invention.

Reference has already been made to the provision of means for raising the upper panels of a heat shield arrangement according to the invention to prevent damage by lifting of the heated material or due to the material being deformed in such a way that its effective height is increased. FIG. 15 illustrates an embodiment of a heat shield arrangement incorporating a further example of such means, in this instance in the form of a self-contained module that can be fitted into an existing rolling mill installation although its functional features are capable of wider application. The module comprises top, bottom and side panels 220, 222, 224 respectively supported on a rigid frame 226 having mounting flanges 228. Elongated slots 230 are formed in the side members 232 of the frame to allow clearance for the mill roller-table rollers (not shown). The bottom panels are mounted on cross-bracing sub-frames (not shown) which increase the stiffness of the frame 226.

Also mounted on the cross-bracing sub-frames are longitudinal bumper or fender bars 234 projecting above the bottom panels to protect them from damage by the hot strip. The bars also help to guide the leading edge of the strip from roller to roller, and when the arrangement is to form part of the original equipment of a rolling mill installation the guidance offered by the bumper bars allows the roller table to be designed with the rollers to be spaced more widely apart than has hitherto been the practice so that there is a corresponding increase of the heat-insulating panel area.

The side panels are protected by bumper or fender elements in the form of upwardly extending bolsters 236 fixed rigidly to the main frame 226. The spacing between the bolsters will be determined by the anticipated measure of sideways movement of the hot strip but generally two bolsters per side panel will be sufficient. In the design of the bolsters a compromise must be reached between mechanical strength and resistance to thermal stresses, as it will be appreciated that there will be larger thermal gradients within them. To minimise the generation of thermal stresses a series of slots or grooves 238 can be formed in the exposed or hot face of each bolster to allow the hot face to expand and contract relatively freely. Thermal stress relieving grooves (not shown) may similarly be used in the hot faces of the bottom bumper bars and the further bumper bars 240 that are provided for the top panels.

Although supported through the rigid frame, the top panels 220 are mounted in a displaceable manner so that they can be lifted away from the roller table. As already mentioned this may be needed, for example, to prevent damage to the top panel is the hot strip lifts from the roller table but it is arranged that minor disturbances will not cause the top panels to lift and they are swung away from the roller table only if excessive upward forces occur on the bumper bars 240. Thus, it has been found that the front end of a hot steel strip can often bounce from roller to roller as it is feeding through the roller table, and it will then strike the bumper bars as it bounces, but not with any very great force. It is therefore an advantage to ensure that the heat shield arrangement remains undisturbed by these relatively minor disturbances, although protective action is needed if excessively large upward forces occur.

In the preferred arrangement shown, the top panel bumper bars 40 are mounted separately from the top panels 220 themselves, on a carrier frame 242 mounted on pivot blocks 44 on the main frame 226, the blocks defining a longitudinal pivot axis at the side of the roller table. Pairs of top panels are mounted each on a separate frame 46 that is also attached to the main frame and that surrounds the associated carrier frame 242. The panel mounting frames are pivoted on the same longitudinal axis as the carrier frames and are capable of relative rotation thereto to a limited extent.

In the closed or operative position of the top panels, as shown by the foremost pair in FIG. 15, each bumper bar carrier frame 242 is held down with a positive holding force by displacement means in the form of fluid pressure rams 248 and bears on adjustable stops 249 mounted on that side of the frame 226 nearer the pivot axis. In the closed position the panel mounting frames are supported separately from the carrier frames, each panel mounting frame having a side flange 250 that can then rest upon the fixed frame 226.

The hold-down force exerted by the rams 248 on the carrier frames will be chosen in dependence upon the type of material being rolled, its temperature, width and thickness. The arrangement is such that if the strip strikes the bars 240 with a force less than the selected level their carrier frame 242 remains in position, but if a higher force is experienced the carrier frame will lift against the pre-loading force and activate a limit switch 251 to switch the pressure connections to the rams, so that the rams are extended and instead of holding down the bumper bars they lift the carrier frame 242. As the carrier frame rises it engages with brackets 252 the associated panel mounting frame and the mounting frame, with the panels mounted on it, are then lifted together with the carrier frame. To ensure positive entrainment of the panel mounting frame by the carrier frame in the downward closing movement, particularly if they are arranged to move to near to or past a vertical position, brackets 253 secured to each carrier frame overlap a portion of its associated panel mounting frame.

In the fully lowered position of each carrier frame, a specific clearance is provided between the brackets 252 and the associated panel mounting frame by virtue of the independent support of the mounting frame on its side flange 250. In this way, while the carrier frame 242 remains in its lower position, the impact loads on its bumper bars are not transmitted to the panels or their mounting frame due to the independent support arrangements of the carrier and support frames. The bumper bars 240 therefore act as part of an independent cushioning system until a preset lifting force is experienced, so protecting the panels until the disturbing force is so great that it displaces the bumper bars sufficiently to raise both carrier and mounting frames, and with them the panels.

As an alternative or an addition to the limit switch already referred to for triggering movement of the bumper bar carrier frame, an inertia switch 251a may be attached to the frame to switch the rams when required. Since the inertia switch will respond in dependence upon the magnitude of the upwards force applied to the bumper bar, before the bar has been displaced significantly by the force, this can provide a more rapid response.

Figure 16:
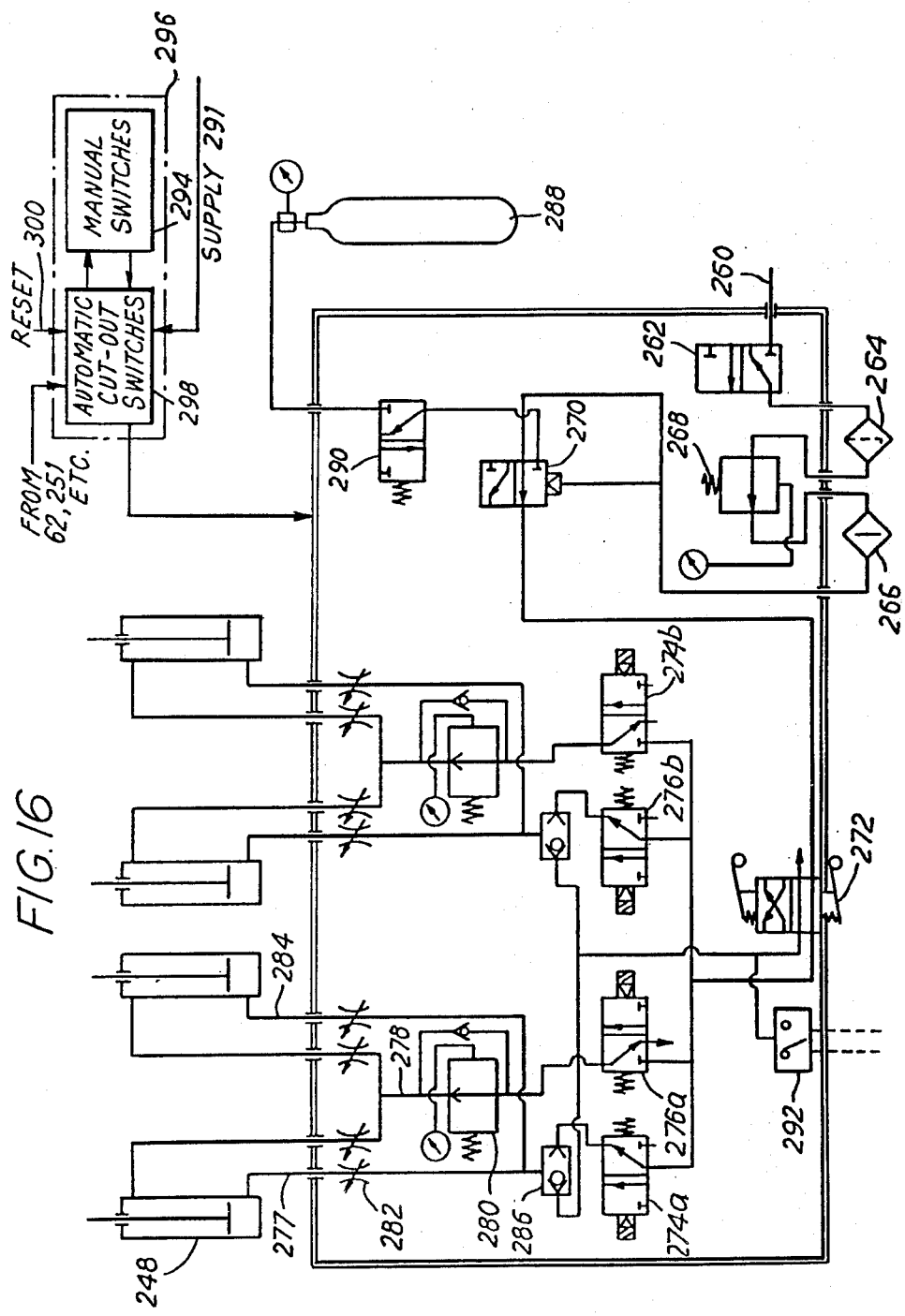
FIG. 16 is a fluid control diagram for the panel displacement means of the arrangement in FIG. 15.

FIG. 16 shows an example of the control circuit that may be employed to operate the rams in the manner already described. A pneumatic control circuit is shown but it will be appreciated that a corresponding hydraulic circuit could be employed for hydraulic rams or indeed an electrical drive and control arrangement could be similarly substituted.

In the circuit shown, a compressed air supply 260 is fed through an electrically operated isolation valve 262, a filter 264, a moisture trap 266, a pressure regulator 268 and a pilot-operated diverter valve 270, to a manually controlled valve 272 having alternative open and closed positions, the open position shown placing the circuit in its normal operating state. Pressure air can pass through the open manual valve 72 to a series of solenoid valves 274a, 274b and 276a and 276b which control the air flows to and from the rams. When the solenoid valves are energised the rams are contracted to lower the top panels, but they are illustrated in their de-energised state, so that pressure air is fed directly through lines 277 at full pressure to the underside of the ram pistons to extend the rams 248 from the contracted state shown and raise the panels rapidly while the ram cylinder spaces above the pistons are exhausted through lines 278 and the solenoid valves.

When the solenoid valves are energized and switched to the opposite positions to those shown, if permitted by the state of pressure control valves 280, pressure air flows through the lines 278 to contract the rams. Flow control valves 282 in the lines 278 and the lines 277 to the underside of the ram pistons control the rate of contraction of the rams 248 and therefore limit the speed at which the panels are lowered. They operate only in this direction of flow and therefore do not limit the speed of movement of the rams when the panels are being raised. The pressure control valves 280 can be adjustably set, and by regulating the supply pressure to the upper sides of the ram cylinders can determine the preload that the rams apply to the upper bar support frame. It will be understood from the foregoing description that the limit switch previously referred to controls the operation of the solenoid valves, so that actuation of the limit switch changes the valves over from a normally energised state.

Spring loaded shuttle valves 286 are provided in the supply lines 277 to the undersides of the rams and are shown in their normally biased positions. If required in an emergency, the solenoid valves can be overridden by switching the manual valve 272 from the position shown. The main supply pressure is then applied to the shuttle valves to switch them over and allow the pressure air to flow directly to the undersides of the rams to lift the panels.

In the event of loss of main supply pressure, the pilot-operated valve 270 automatically reverses to isolate the mains supply line and to connect to the control circuit a back-up supply such as from a compressed air bottle 288. This back-up supply is fed through a further pilot-operated valve 290 which remains operative only if the back-up supply is pressurised. If the back-up pressure falls the valve 290 closes and with both pilot-operated valves then closed the control circuit is isolated.

The solenoid valves are energised from supply 291 and may be operator controlled by means of electrical circuits from switches 294 mounted on a remote control panel to raise or lower the panels. Automatic override signals, initiated by switches such as the switches 251, 251a on the panel bumper bars or their mountings, or from separate detector means (such as the detector 62 in FIG. 6) mounted upstream of the heat shield arrangement to be operated by bent or buckled stock entering the mill roller table, can act on electromagnetic cut-out switches 298 to cut off the electrical supply to the solenoid valves through the switches 294, thereby raising the panels. The cut-out switches 298 require to be re-set before the switches 294 become operative. Typically, the control panel will have a manual reset 300 for re-energising the automatically actuated cut-out switches to restore the electrical supply. Additionally, if the manual override valve 272 is switched to raise the rams directly as already described, pressure air is then also fed to a pneumatic or hydraulic switch 292 to isolate the electrical circuits and thereby de-energising the cut-out switches preventing remote control of the rams in this condition.

Figure 17:
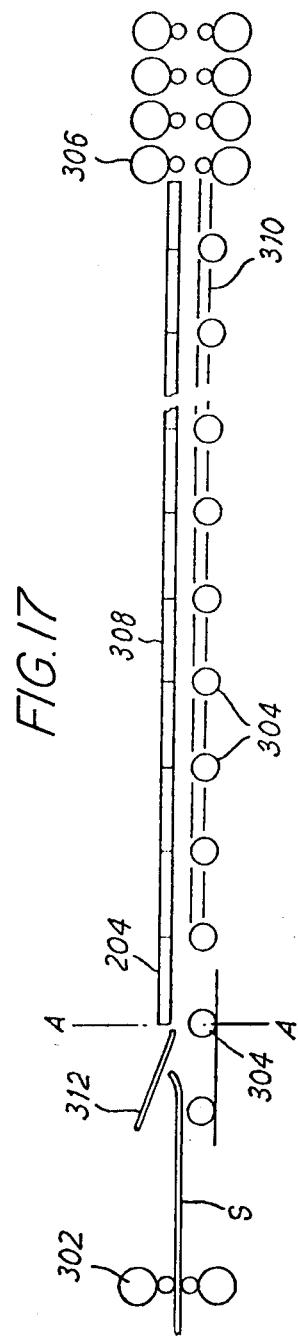
FIG. 17 is a schematic side view of a heat shield arrangement according to the invention between successive roll stands in a continuous rolling mill.

FIG. 15 shows the upper and lower panels at a uniform and relatively close vertical spacing, but this may not be possible at the entry region of the heat shield arrangement. FIG. 17 shows a section through a continuous rolling mill in which the material being rolled passes continuously through roughing stands 302, along the roller table 304 to the finishing stands 306. In this process it is not uncommon for the nose end of the slab or strip S to acquire a turn-up or set so that it is raised from the roller table to such an extent that it would not be able to enter the small spacing between the series of upper and lower panels 308, 310. To overcome this problem and to ensure that quite large turn-ups can be accommodated, the arrangement has an entry region provided with guide means 312 that form an entry passage of increased height.

Figure 18:
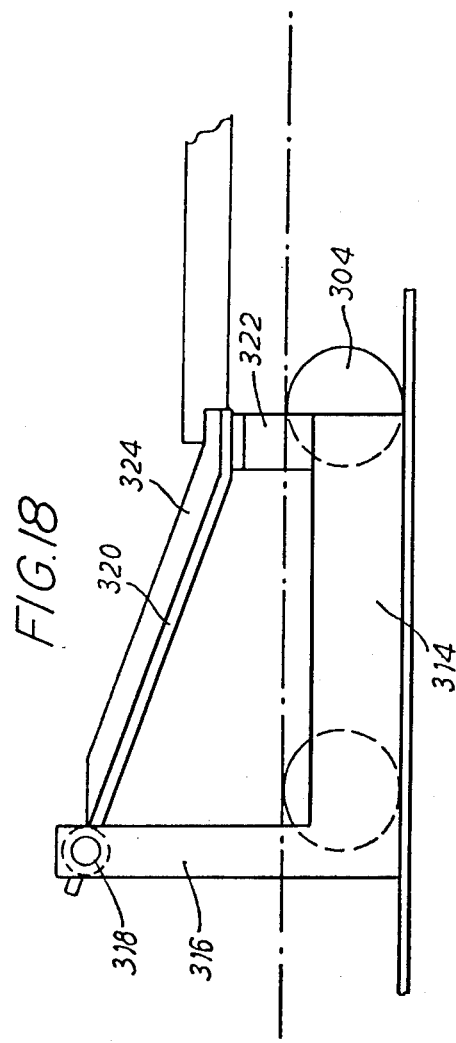
FIG. 18 shows to a larger scale a detail of the entry end of the heat shield arrangement of FIG. 17.

As FIG. 18 shows in more detail, the guide means comprise a robust base frame 314 that is clamped to the side walls of the existing roller table or is fixed rigidly to the mill foundations. Vertical members 316 of the frame support a transverse pivot bar 318 to which the leading end of a nose entry guide member 320 is attached. The guide member can thus pivot with the bar 318 but it normally rests upon adjustable bottom stops 322 at its rear end. The guide member takes the form of a reinforced frame or plate structure and includes a central spar 324 that extends under the main bumper bar of the first upper panel of the heat shield arrangement.

In use, the guide member will normally remain in its illustrated position under the combined action of its own weight and the hold-down force that is being applied to the bumper bar. The entering sheet material, if above the height of the bumper bar, will strike the guide member and be urged downwards to below the level of the bumper bar. If the turn-up or deformation of the entering material is such as to be able to force the entry guide member upwards, this will also displace its adjoining bumper bar and, as previously described, the panel raising mechanism will be operated. On the other hand, since the entry member can be of a very robust construction it is possible to arrange that it offers considerable resistance to displacement and thereby partially corrects any turn-up of the entry material.

Figures 19, 20:
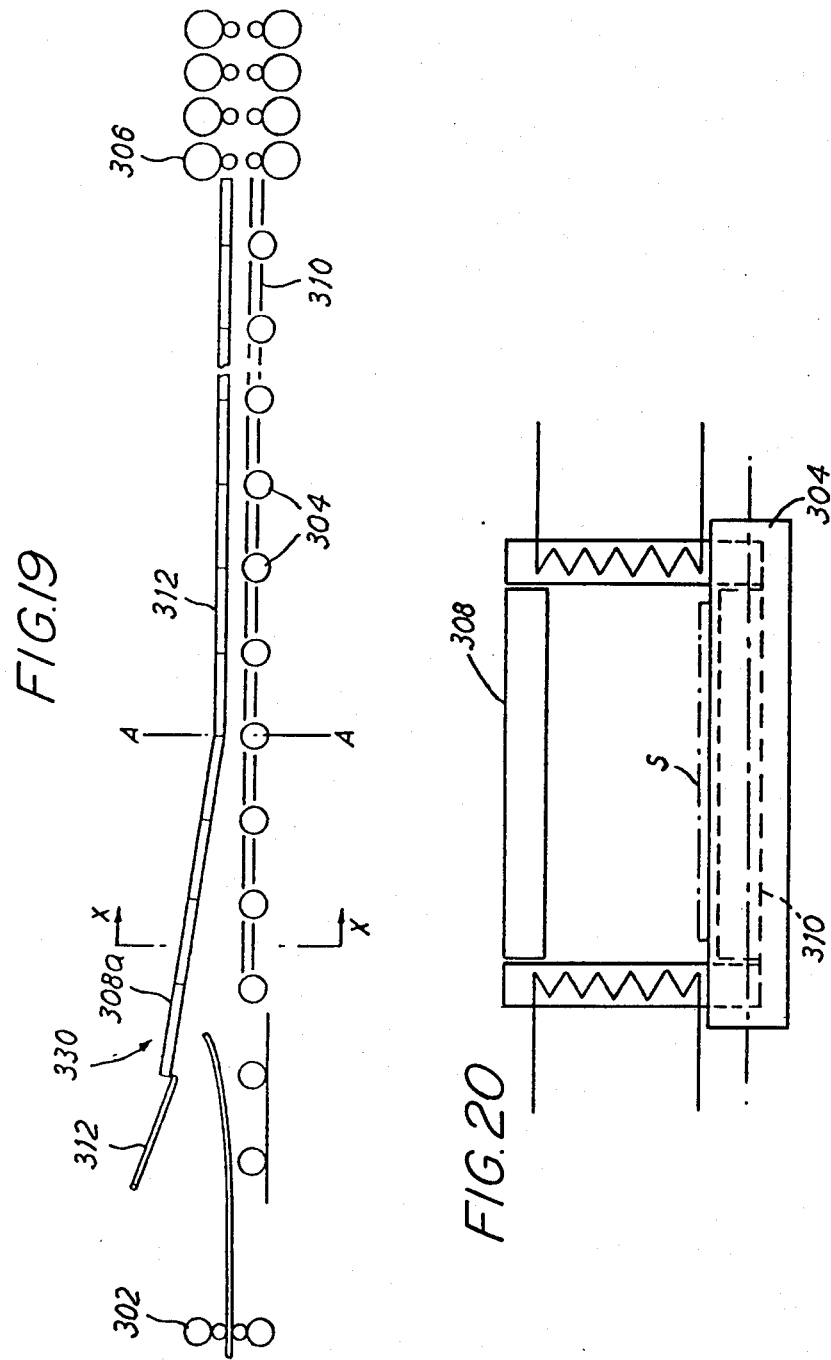
FIG. 19 is a schematic side view of a heat shield arrangement according to the invention between successive roll stands in a semi-continuous rolling mill.
FIG. 20 is a sectional view on the line X—X in FIG. 19.

In other types of rolling mill the above-described entry guide means may not be sufficient. For example in semi-continuous mills the material is reduced from slab-form by consecutive passes backwards and forwards through reversing roughing stands. In this process there are considerably greater variations in turn-up or lift of the material than in a continuous rolling process and a much greater entry height must be permitted. In that case, to employ entry guide means with little or no heat-insulating effect, as shown in FIGS. 3 and 4, may make it difficult or impossible to provide an effective heat shield arrangement and an arrangement such as is illustrated in FIG. 19 may be required.

Figure 21:
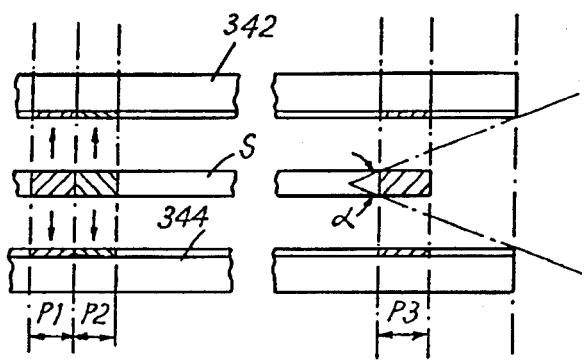
FIG. 21 is a schematic illustration to explain the manner in which different heat loss rates occur over the width of a hot strip.

In this arrangement, an increased height entry section 330 continues over part of the extent of the heat-insulating panels themselves, and this may occupy up to some 40% of the length of the roller table 304. The guide means 312 itself is generally similar to that already described with reference to FIG. 18, but is of course disposed at a higher level. As before it co-operates with the bumper bar associated with the leading upper panel 308a.

Where it is necessary to have a substantial vertical spacing between the upper and lower insulating panels, a further difficulty may arise, as will now be explained with reference to FIG. 21 which shows in schematic form a part of a transverse cross-section of a hot strip S as on a rolling mill delay table between mills, with heat shield panels 342, 344 above and below the strip respectively. In the central part of its width at portions such as P1 and P2 of the strip, most of the heat radiated from the hot strip will effectively go to heat up portions of corresponding width of the heat shield panels. Some fall of temperature will result, to a similar extent for all such portions in the central region of the strip width.

At the edges of the strip, however, conditions are no longer uniform. Because a large proportion of the energy radiated from a marginal portion such as the edge width P3 will fall on parts of the heat shield panels which are beyond the width of the strip, this marginal portion of the strip gives up more heat to the panels so that there will be a greater fall in the temperature of the strip at its lateral margins.

This effect will be increased by heat loss to the sides between the top and bottom panels of the shield, where the energy radiated from the strip over an angle $\alpha$ will be directly lost. The direct radiation loss can be reduced by increasing the width of the shield relative to the strip, but then there is a greater energy loss from the hot strip to heat the margnal portions of the heat shield panels that will be particularly marked during start-up.

Figure 22:
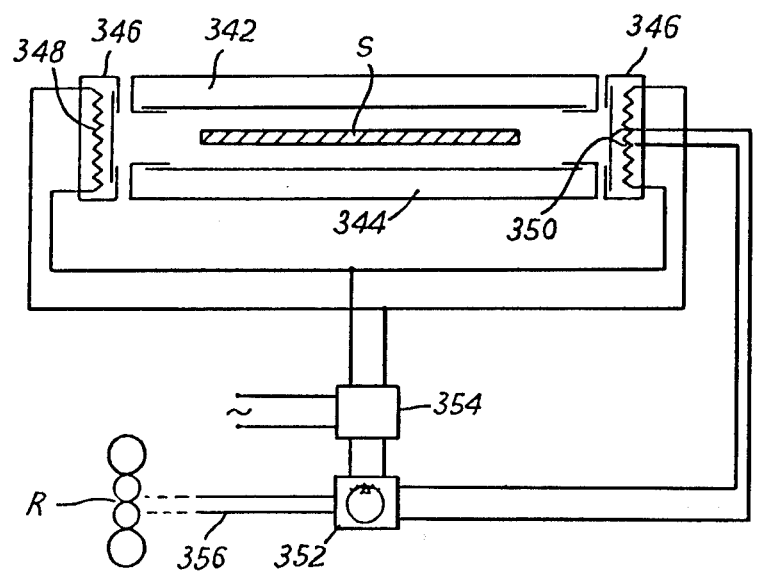
FIG. 22 is a diagrammatic sectional view of a heat shield arrangement having side insulating panels with heating means according to the invention.

FIG. 22 illustrates one form of hot strip rolling mill arrangement according to the invention in which in addition to upper and lower heat-insulating panels 342, 344 heat-insulating side panels 346 are mounted at the outer edges of the upper and lower panels to form a heat shield surrounding the path of the hot strip S. It will be clear from the preceding explanation with reference to FIG. 21 that blocking off direct leakage of radiant energy from the edges of the strip in this manner will be advantageous under steady state conditions, but the side panels will themselves act as a heat sink when cold and the situation may only be improved slightly during start-up conditions.

To overcome this problem, the side panels are provided with heating means 348, which may be either contained within the panels, immediately behind an inner cover plate as illustrated, or be mounted over the inward face of the panels. In general it will be found that electrical heating elements provide the most convenient method of giving the flexibility of operation that is required, but other forms of heating such as radiant tube gas or oil burners can be used.

Although not shown in detail in the drawings, each of the heat-insulating panels may comprise a thin-walled casing containing a core of one or more layers of heat insulating material.

Temperature sensors 350 are located at convenient intervals along the length of the side panels 346 to monitor the inner surface temperature and the sensor signals are utilised by a controller 352 and voltage regulator 354 to provide a stepped power input to the heating elements of side panels for controlling the surface temperature.

In operation the apparatus may be controlled in the following manner. The desired side panel surface temperatures are first selected on the controller 352 and if the sensed values are below these temperatures the controller actuates the voltage regulator so that a controlled power supply is fed to the heating elements. Instead of relying on voltage regulation the control may operate by on/off switching of the heating elements. An interlock arrangement 356 prevents the heating of the side panels being switched on unless the finished stands R of the mill are ready for production. Once steady state conditions are reached and the control system switches off the side panel heaters, the panels of course continue to function as part of a passive heat shield arrangement. It will be understood that in particular installations it may be required to also have heating means associated with the upper and/or lower panels and these may then be operated in a similar manner.

It will be clear that the provision of such side heating means can be of particular advantage in the heat shield arrangement shown in FIG. 19, where there is a considerable distance between the upper and lower panels in the entry region of the roller table. As indicated by FIG. 20, therefore, the heating means as already described with reference to FIG. 22 can be employed over the increased height entry region. It will be understood that the use of such side heating means can be employed elsewhere in heat shield arrangements according to the invention, and may even be provided along the complete length of the heat shield arrangement if required.

We claim:

1. A heat shield arrangement for a heated length of sheet material comprising heat-insulating panels arranged adjacent a travel path for the material and including series of upper and lower panels above and below said path respectively, said upper and lower panels having a vertical spacing of limited height along at least an intermediate region of the longitudinal extent of the heat shield arrangement, an entry region of the arrangement providing an increased-height passage for the introduction of a turned-up material and said entry region passage decreasing in height to lead into the limited vertical spacing of said intermediate region, a reinforced frame or plate structure forming at least part of said entry region, said structure comprising an upwardly displaceable element, means for applying a hold-down force for restraining the upward displacement of said element, and means for raising the upper insulating panels away from the material path arranged to be actuated by the displacement of said element against the force of said restraining means.

2. A heat shield arrangement according to claim 1 wherein the vertical spacing between the upper and lower panels immediately adjacent said structure is greater than said limited vertical spacing.

3. A heat shield arrangement according to claim 2 wherein a plurality of said upper and lower heat insulating panels form at least a part of said entry region and the vertical distance between which panels is progressively reduced along the length of the material path towards said intermediate region.

4. A heat shield arrangement according to claim 3 having heat insulating panels at the sides of the material path and heating elements carried by at least some of said panels.

5. A heat shield arrangement according to claim 3 having heat insulating panels at the sides of the material path and heating elements carried by at least some of said panels, said heating elements being arranged over at least a part of said entry region having an incresed vertical spacing between the upper and lower panels.

6. A heat shield arrangement according to claim 4 wherein temperature sensors are provided in juxtaposition with the side panels having heating elements for the control of the power input to said heating elements.

7. A heat shield arrangement according to claim 1 wherein the raising of said element is arranged to act to raise said panels through sensing means disposed along the extent of said intermediate region.

8. A heat shield arrangement according to claim 1 having pivot means for the displacement of said upwardly displaceable element, said pivot means having an axis directed transverse to the material path and at a leading end of said structure from which said element extends in the direction of travel of the sheet material.

* * * * *